United States Patent
Ohman, III et al.

(10) Patent No.: US 9,206,829 B2
(45) Date of Patent: Dec. 8, 2015

(54) RETAINING PIN ASSEMBLY FOR A LIFTING SYSTEM

(71) Applicant: The Crosby Group LLC, Tulsa, OK (US)

(72) Inventors: Roger Ohman, III, Broken Arrow, OK (US); Larry Postelwait, Catoosa, OK (US)

(73) Assignee: THE CROSBY GROUP LLC, Tulsa, OK (US)

( * ) Notice: Subject to any disclaimer, the term of this patent is extended or adjusted under 35 U.S.C. 154(b) by 225 days.

(21) Appl. No.: 13/849,990

(22) Filed: Mar. 25, 2013

(65) Prior Publication Data

US 2013/0280009 A1    Oct. 24, 2013

Related U.S. Application Data

(60) Provisional application No. 61/637,519, filed on Apr. 24, 2012.

(51) Int. Cl.
*E01B 9/12* (2006.01)
*F16B 19/00* (2006.01)
*B66C 1/34* (2006.01)
*F16B 21/12* (2006.01)

(52) U.S. Cl.
CPC . *F16B 19/00* (2013.01); *B66C 1/34* (2013.01); *F16B 21/12* (2013.01)

(58) Field of Classification Search
CPC ........................................................ E01B 9/12
USPC .................................................. 411/337, 513
See application file for complete search history.

(56) References Cited

U.S. PATENT DOCUMENTS

| | | | | |
|---|---|---|---|---|
| 3,995,675 A * | 12/1976 | Cosenza | ....................... | 411/353 |
| 4,962,901 A * | 10/1990 | Shirley et al. | ................. | 411/401 |
| 5,674,034 A * | 10/1997 | Bennett | ........................ | 411/197 |
| 6,095,735 A * | 8/2000 | Weinstein et al. | ............ | 411/221 |
| 7,000,905 B1 | 2/2006 | Lutter et al. | | |
| 7,255,330 B2 | 8/2007 | Lutter et al. | | |
| 7,293,763 B2 | 11/2007 | Lutter et al. | | |
| 8,171,690 B2 * | 5/2012 | Ghatikar et al. | .............. | 411/531 |
| 2006/0119121 A1 | 6/2006 | Lutter et al. | | |

FOREIGN PATENT DOCUMENTS

EP   WO2010002384   1/2010

* cited by examiner

*Primary Examiner* — Roberta Delisle
(74) *Attorney, Agent, or Firm* — Head, Johnson & Kachigian, P.C.

(57) ABSTRACT

A retaining pin assembly for a lifting system which includes a hook prong and a hook cam. The retaining pin assembly includes at least one lock arm assembly having a first end with at least one aperture which aligns with an opening through the hook cam and having an opposed second end with at least one aperture which aligns with an opening through the hook prong. A hook cam retaining pin has a head and has a shaft passing through the hook cam opening and the lock arm first end aperture, wherein the shaft has at least one groove therein parallel to the axis of the shaft. A retaining ring surrounds the hook cam shaft, the retaining ring having at least one inwardly extending tab received in the shaft groove in order to retain the pin in the lock arm. A recess in the lock arm receives the retaining ring therein.

20 Claims, 6 Drawing Sheets

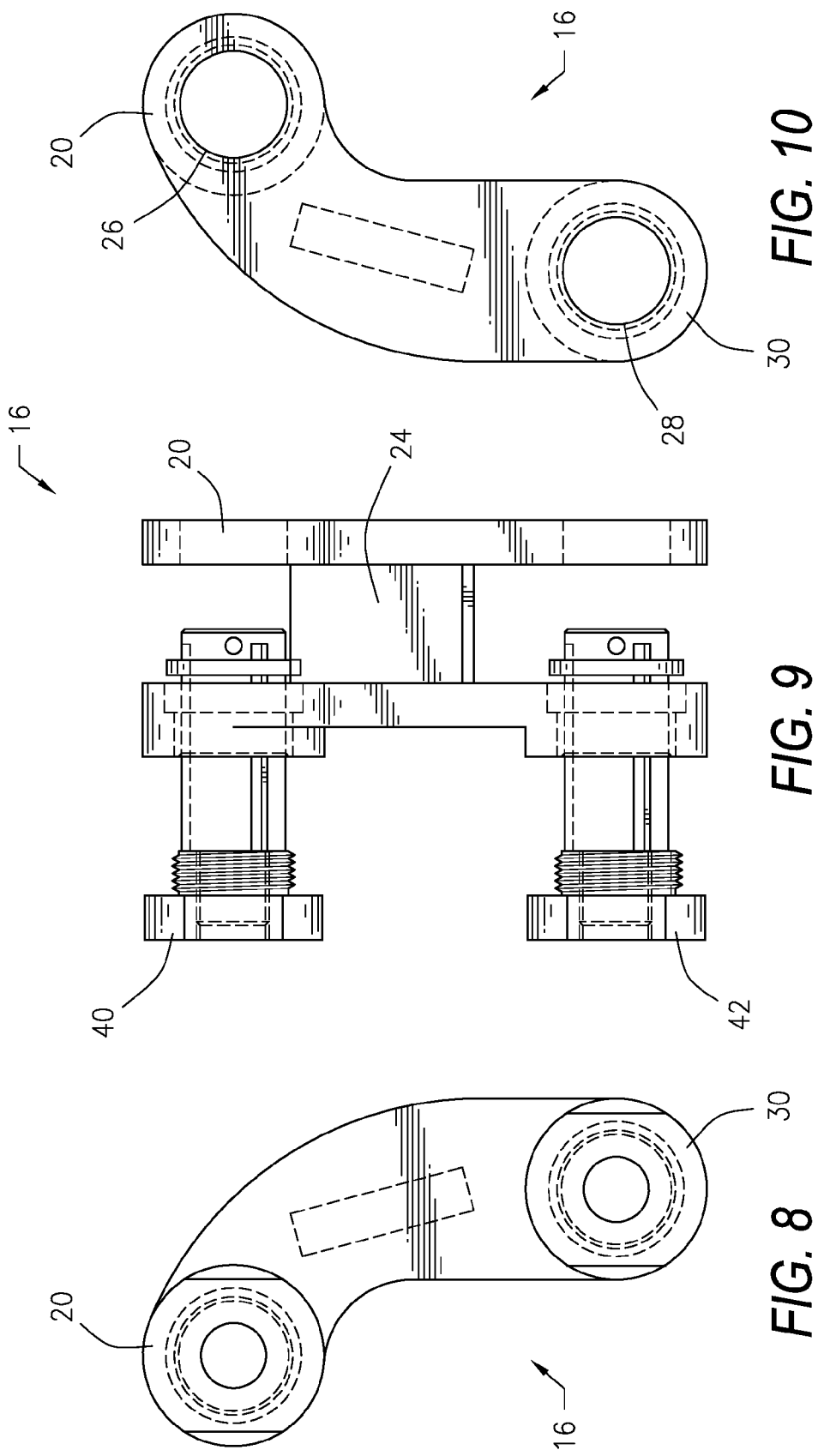

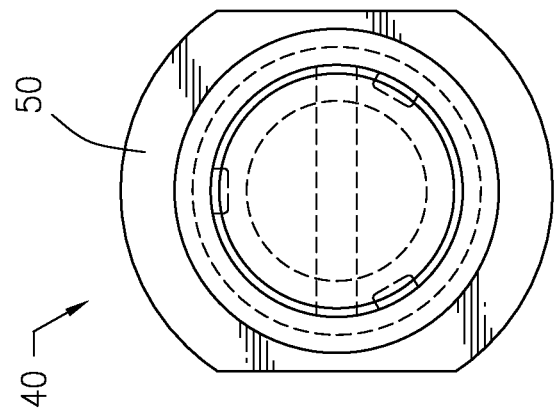
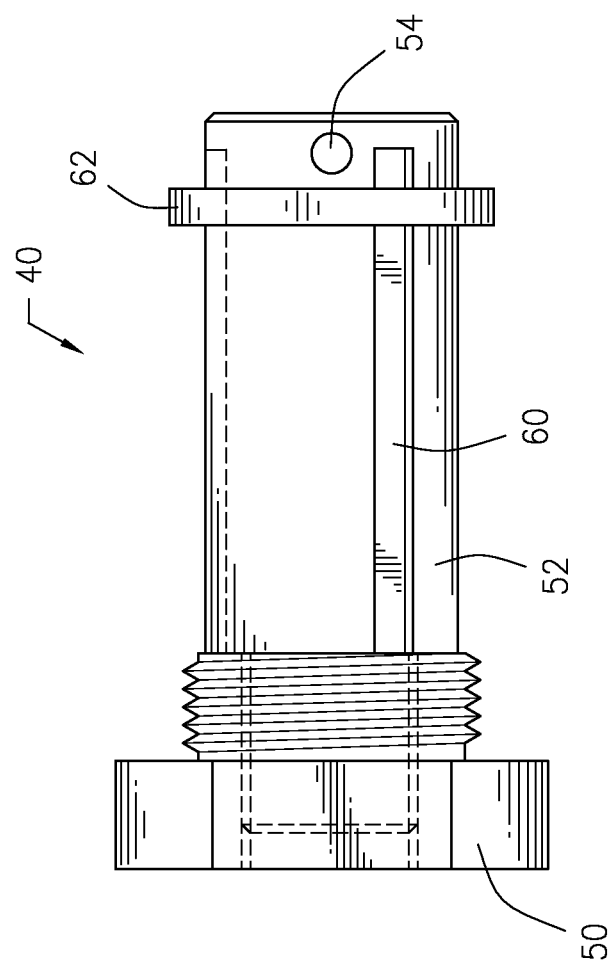
FIG. 12
FIG. 11

RETAINING PIN ASSEMBLY FOR A LIFTING SYSTEM

This application claims priority to U.S. Provisional Patent Application No. 61/637,519, filed Apr. 24, 2012, which is herein incorporated by reference.

BACKGROUND OF THE INVENTION

1. Field of the Invention

The present invention is directed to a retaining pin assembly for a lifting system. In particular, the present invention is directed to a retaining pin assembly wherein a retaining pin and a retaining ring maintain a lock arm or bail arm in place in a closed position when in use and wherein the retaining pin may be partially retracted so that the retaining ring resides in a recess in the lock arm or bail arm.

2. Prior Art

In a number of lifting or hoisting devices, such as tubing blocks, a hook or multiple hooks are utilized for lifting. An elevator link, wire line, chain or other load is installed in the hook in order to support a load. When in use, the hook is kept in a closed position by a lock arm, a bail arm or a latch. The lock arm is kept in the closed position by a retaining pin or pins. In order to disassemble the lifting device, the lock arm, bail arm or latch is unfastened by retracting the retaining pin or pins.

In a number of applications, a retaining pin passes through the lock arm and a hook cam and locks or secures the lock arm in place. A retaining pin also passes through the lock arm and a hook prong. The pins may have a threaded connection to the lock arm or may be held by a cotter pin.

The lock arms are engaged for use and disengaged in the field under a wide variety of conditions. It would be advantageous to be able to retract the retaining pin or pins from the lock arm without removing the retaining pin or pins from the lifting assembly.

Accordingly, it is a principal object and purpose of the present invention to provide a retaining pin assembly for a lifting system wherein a retaining pin will pass through the lock arm when in a use position and wherein the retaining pin may be retracted without disengaging the retaining pin from the lock arm.

It is a further object and purpose of the present invention to provide a retaining pin assembly having one or more grooves or slots in a retaining pin shaft to hold a retaining ring thereon.

It is a further object and purpose of the present invention to provide a retaining pin assembly with a retaining ring wherein the retaining ring may be withdrawn into a recess in a lock arm during assembly and disassembly.

SUMMARY OF THE INVENTION

The present invention is directed to a retaining pin assembly for a lifting system. In one embodiment, a first hook is retained in a closed position by a first hook lock arm assembly and a second hook is retained in a closed position by a second hook lock arm assembly. The lock arm assembly comprises a pair of parallel lock arms joined together by a cross arm. The first ends of the lock arm assembly have apertures therethrough which surround a hook cam. A hook cam retaining pin includes a head with an extending shaft passing through the hook cam opening and also through the lock arm first end apertures.

The lock arm assembly also includes an opposed second end with apertures therethrough which align with an opening through a hook prong. The second ends of the lock arm assembly surround the hook prong.

A hook prong retaining pin includes a head with an extending shaft passing through the hook prong opening and also through the lock arm assembly second end apertures 28.

In a preferred embodiment, three shaft grooves are arranged around the shaft. The grooves are parallel to each other and parallel to an axis of the shaft. A retaining ring fits around the exterior circumference of the shaft and includes a series of inwardly extending tabs received in the grooves. The retaining ring and the inwardly extending tabs received in the grooves permit axial movement of the shaft but prohibit removal of the retaining pin from the lock arm assembly.

BRIEF DESCRIPTION OF THE DRAWINGS

FIGS. 8, 9 and 10 illustrate alternate views of a lock arm assembly apart from the lifting system shown in FIG. 1;

FIG. 11 shows a side view and FIG. 12 shows an end view of a retaining pin apart from the lifting system of the present invention; and FIGS. 13 and 14 illustrate alternate views of the retaining pin shown in FIGS. 11 and 12 while

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
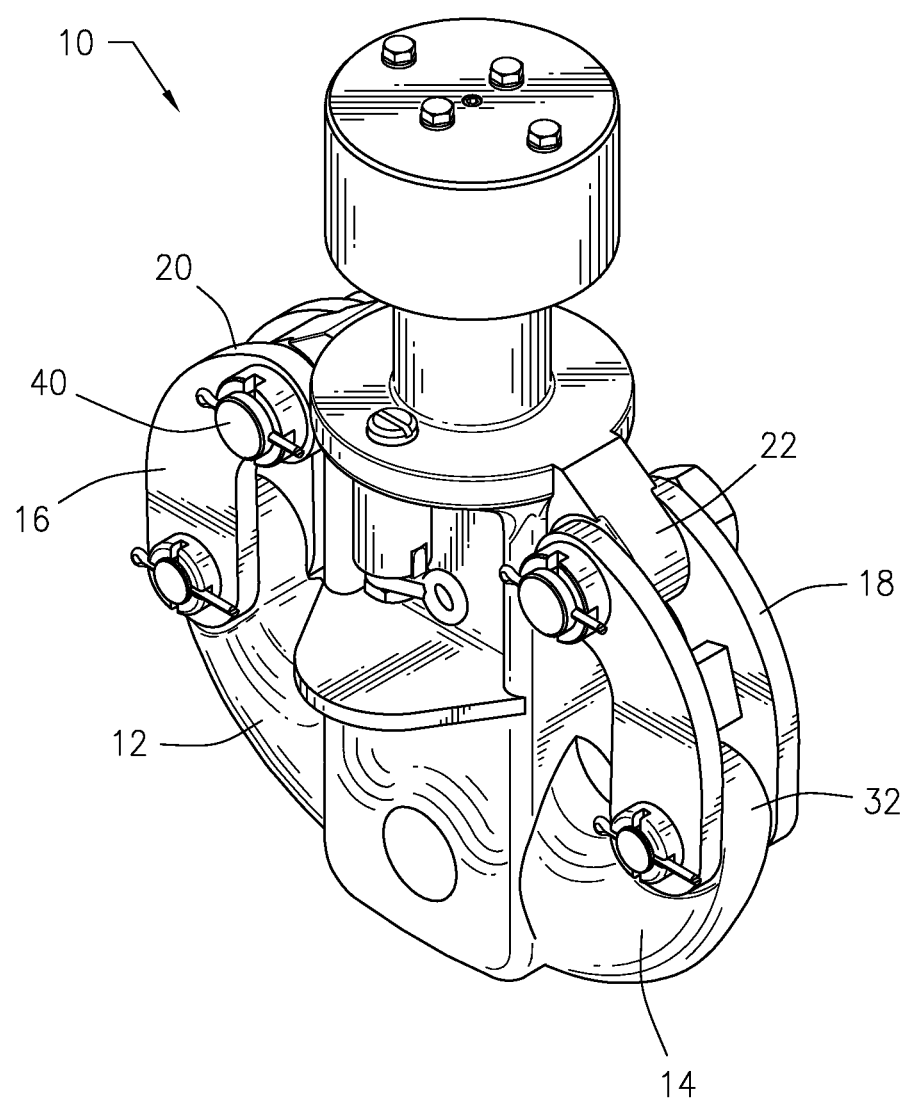
FIG. 1 illustrates a perspective view.
Figure 2:
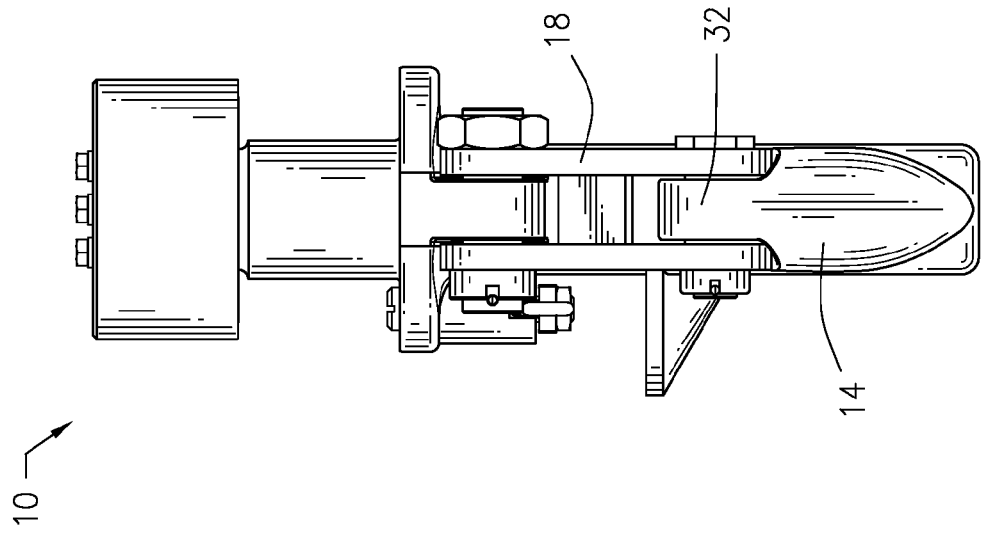
FIG. 2 illustrates a side view and FIG. 3 illustrates a front view of a preferred embodiment of a retaining pin assembly for a lifting system constructed in accordance with the present invention.
Figure 3:
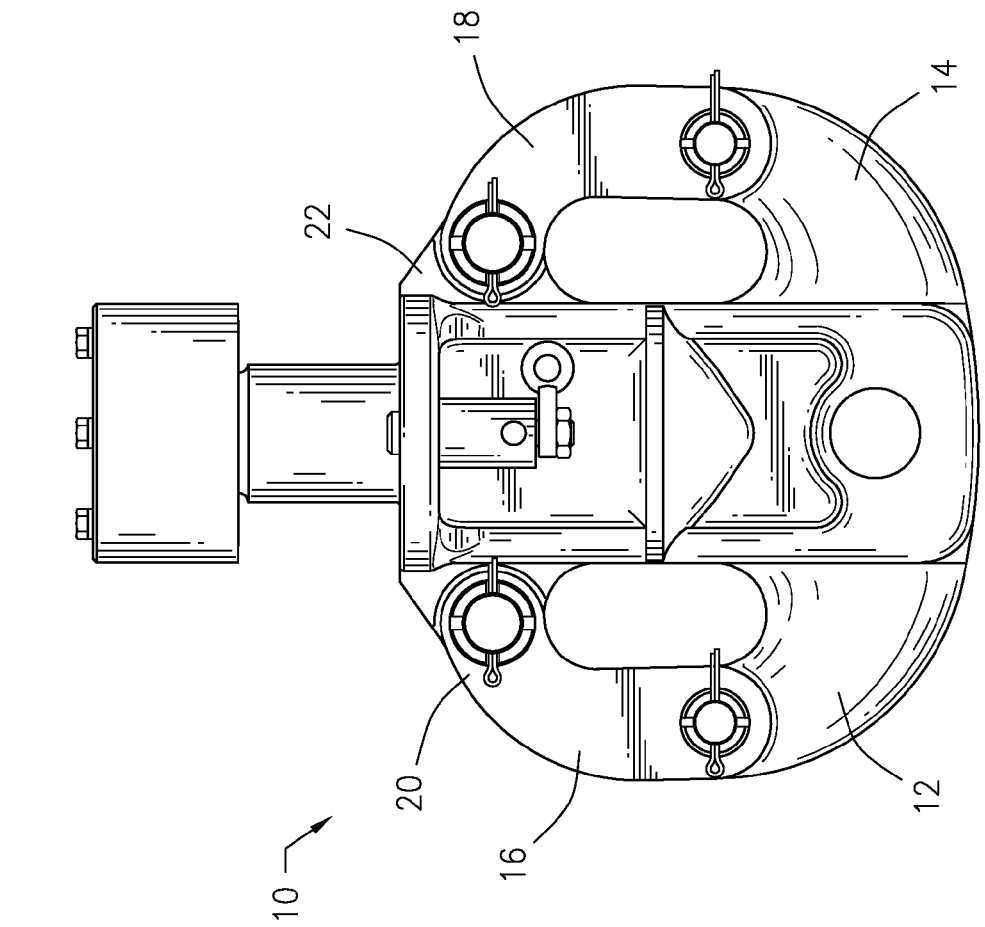

Referring to the drawings in detail, FIG. 1 illustrates a perspective view of one preferred embodiment of the present invention 10 with a two prong tubing block hook subassembly. FIG. 2 illustrates a side view and FIG. 3 illustrates a front view of the tubing block hook subassembly shown in FIG. 1. The subassembly 10 includes a first hook 12 and a second hook 14. It will be appreciated that other configurations, such as one, three, or four hook systems, might be employed within the spirit and scope of the present invention.

An elevator link, a wire line, chain or other load supporting mechanism (not shown) would reside within the prongs of the hook 12 and 14 when in use. The hooks are either in a closed position for use or an open position for insertion or removal.

In the present embodiment, the lifting system 10 is, in turn, a subassembly of an oilfield tubing block (not shown).

When in use, the first hook 12 is retained in a closed position by a first hook lock arm or bail arm assembly 16 and the second hook 14 is retained in a closed position by a second hook lock arm or bail arm assembly 18. The lock arm assemblies 16 and 18 have an arched or arcuate shape although other configurations are possible within the spirit and scope of the present invention.

Figure 4:
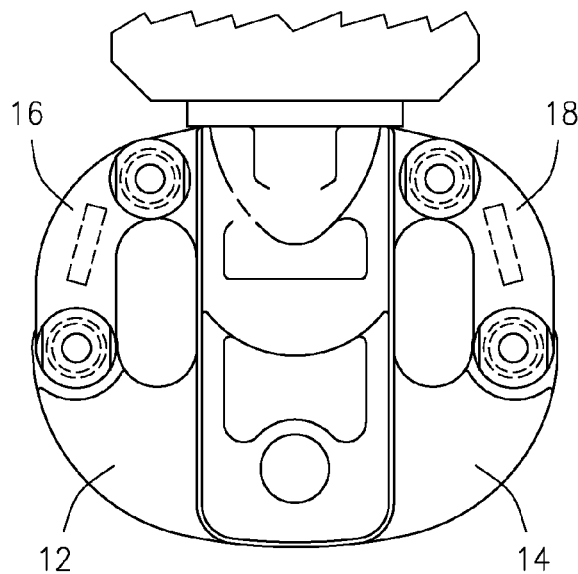
FIG. 4 illustrates a front view and FIG. 5 illustrates a side view of the lifting system shown in FIG. 1 with the lock arm assemblies secured in place for use.
Figure 5:
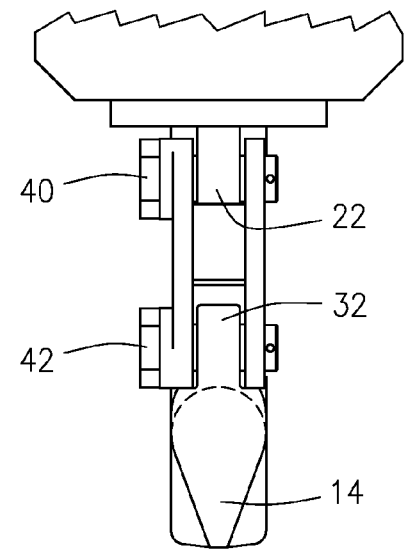
Figure 6:
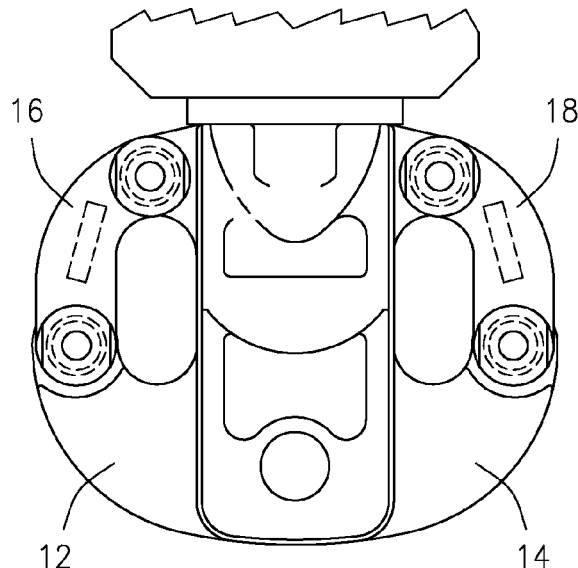
FIG. 6 illustrates a front view and FIG. 7 illustrates a side view of the lifting system shown in FIGS. 4 and 5 with one of the lock arm assemblies unsecured from the lifting system.
Figure 7:
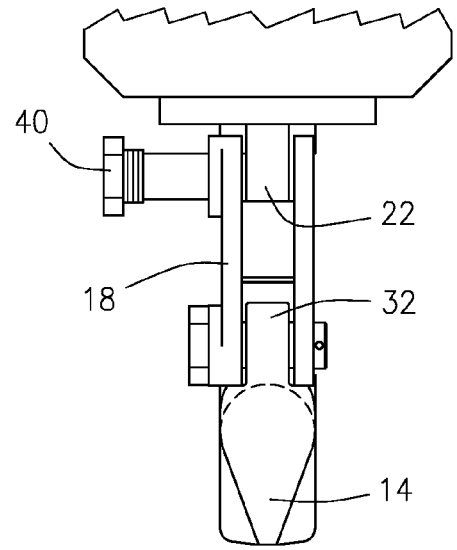

FIGS. 4 and 5 illustrate a front view and a side view of the lifting system 10 with the lock arms 16 and 18 secured in place for use. FIGS. 6 and 7 illustrate a front view and a side view of the lifting assembly, respectively, with one of the lock arms disengaged for disassembly.

FIGS. 8, 9 and 10 illustrate alternate views of the lock arm assembly 16 apart from the lifting system 10.

The lock arm assembly 16 has a first end 20 with at least one aperture 26 therethrough as best seen in FIG. 10. The aperture 26 aligns with an opening through a hook cam 22 which protrudes from the hook 14. A hook cam 22 also protrudes from hook 12. In a preferred embodiment, the lock arm assembly 16 comprises a pair of parallel lock arms joined together by a cross arm 24 visible in FIG. 9. The first ends 20 of the lock arm surround the hook cam 22 as seen in FIG. 5. The space between the parallel lock arms is slightly larger than the width of the hook cam 22.

The lock arm assembly 16 also includes a second end 30 opposed to the first end 20 with at least one aperture 28 therethrough which aligns with an opening through a hook prong 32 which protrudes from the hook 14.

The second ends 30 of the lock arm assembly 16 surround the hook prong 32 as best seen in FIG. 5. The space between the parallel lock arms is slightly larger than the width of the hook prong.

A hook cam retaining pin 40 includes a head and an extending shaft. The retaining pin shaft passes through the opening in the hook cam 22 and also through the lock arm assembly first end 20 aperture 26.

A hook prong retaining pin 42 includes a head and an extending shaft. The retaining pin shaft passes through the opening in the hook prong 32 and also through the lock arm assembly second end 30 aperture 28.

Figure 15:
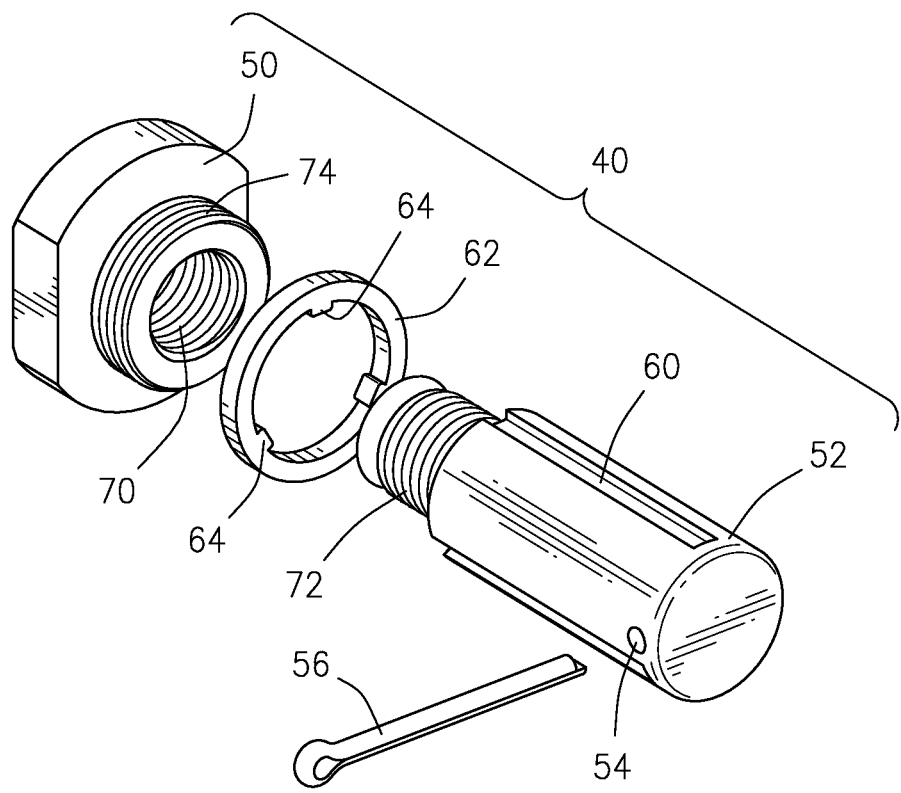
FIG. 15 illustrates an exploded view of the retaining pin.

FIG. 11 shows a side view and FIG. 12 shows an end view of a hook cam retaining pin 40. The hook cam retaining pin 40 is shown in alternate perspective views in FIGS. 13 and 14 and is shown in exploded view in FIG. 15. The hook prong retaining pin 42 (not shown in FIGS. 11 through 15) would have a similar configuration.

The retaining pin 40 includes a head 50 and a shaft 52 extending therefrom. The hook cam retaining pin 40 may include an opening 54 transverse to the shaft at an end opposed to the head 50 to receive a cotter pin 56 or like device.

At least one shaft slot or groove 60, and in a preferred embodiment three shaft grooves 60, are provided in the shaft 52. The grooves 60 are parallel to each other and parallel to an axis of the shaft 52. A retaining clip or retaining ring 62 fits around the exterior circumference of the shaft 52 and includes a series of inwardly extending tabs 64. Each of the tabs 64 is received in one of the grooves 60.

Figures 13, 14:
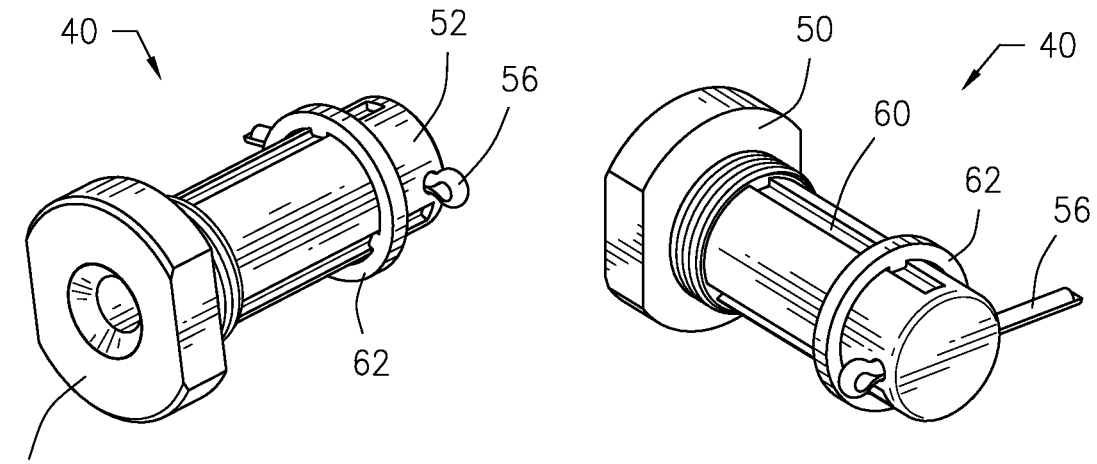

FIGS. 13 and 14 illustrate alternate perspective views of the retaining pin 40 with the cotter pin 56 inserted therein. As best seen in the exploded view in FIG. 15, the head 50 of the retaining pin 40 may be removably attached to the shaft 52 by threads 70 and 72. This arrangement allows for initial installation of the retaining ring 62 around the shaft 52 of the pin 40. Once the head 50 has been threadably secured to the shaft 52, the retaining ring 62 is trapped around the shaft. The retaining ring 62 may be moved axially along the shaft 52 but may not be removed therefrom. The retaining ring 62 and the inwardly extending tabs 64 received in the grooves permit axial movement of the shaft but prohibit removal of the retaining pin from the lock arm assembly.

Additionally, and optionally, threads 74 may be provided to mate with inner threads on an aperture on the lock arm assembly first end 20.

In order to disassemble the device, the cotter pin 56 is removed from the opening 54 in the shaft 52 of the retaining pin 40. This will permit axial movement of the retaining pin 40.

Thereafter, the shaft 52 is axially withdrawn from the lock arm assembly 16 until the retaining ring 62 resides in a circular recess in the lock arm assembly 16. The circular recess surrounds and is axially aligned with the aperture 26 through the first end 20. In this position, the shaft 52 of the retaining pin is clear of the opening between the parallel lock arms so that the lock arm assembly 16 may be separated from the hook cam 22.

The hook prong retaining pin 42 operates in similar fashion with the second end 30 of the lock arm.

Whereas, the present invention has been described in relation to the drawings attached hereto, it should be understood that other and further modifications, apart from those shown or suggested herein, may be made within the spirit and scope of this invention.

What is claimed is:

1. A retaining pin assembly for a lifting system wherein said lifting system includes a hook prong and a hook cam, said retaining pin assembly comprising:
    at least one lock arm having a first end with at least one aperture which aligns with an opening through said hook cam and having an opposed second end with at least one aperture which aligns with an opening through said hook prong;
    a hook cam retaining pin having a head and having a shaft passing through said hook cam opening and said lock arm first end aperture, wherein said shaft has at least one groove therein parallel to the axis of said shaft which move extends to said head of said retaining pin and wherein said hook cam retaining pin has external threads which mate with threads in said hook cam aperture;
    a retaining ring surrounding said hook cam retaining pin shaft; said retaining ring having at least one inwardly extending tab received in said at least one shaft groove adapted to retain said hook cam retaining pin in said lock arm; and
    a recess in said lock arm adapted to receive said hook cam retaining ring therein when said hook cam retaining pin is axially retracted.

2. A retaining pin assembly for a lifting system as set forth in claim 1 wherein said at least one lock arm comprises a pair of parallel lock arms joined by a cross arm, wherein said first end of each of said lock arms surround said hook cam and wherein said second end of each of said lock arms surround said hook prong.

3. A retaining pin assembly for a lifting system as set forth in claim 2 wherein a space between said pair of parallel lock arms is slightly larger than a width of said hook cam and a width of said hook prong.

4. A retaining pin assembly for a lifting system as set forth in claim 1 wherein said at least one groove comprises three parallel grooves in said retaining pin shaft.

5. A retaining pin assembly for a lifting system as set forth in claim 1 wherein at least a portion of said retaining pin shaft is threaded.

6. A retaining pin assembly for a lifting system as set forth in claim 1 including a hook prong retaining pin having a head and having a shaft passing through said hook prong opening and said lock arm second aperture, wherein said hook prong retaining pin shaft has at least one groove therein parallel to the axis of said shaft;
- a retaining ring surrounding said hook prong shaft, said retaining ring having at least one inwardly extending tab received in said at least one shaft groove in order to retain said pin in said lock arm; and
- a recess in said lock arm to receive said retaining ring therein when said hook prong retaining pin is axially retracted.

7. A retaining pin assembly for a lifting system as set forth in claim 6 wherein said at least one lock arm comprises a pair of parallel lock arms joined by a cross arm, wherein said first ends of said lock arms surround said hook cam and wherein said second ends of said lock arms surround said hook prong.

8. A retaining pin assembly as set forth in claim 6 wherein said hook prong retaining pin head is threadably connected to said shaft.

9. A retaining pin assembly as set forth in claim 1 wherein said lifting system is a one or more prong hook system.

10. A retaining pin assembly as set forth in claim 9 wherein said lifting system is an oil field tubing block.

11. A retaining pin assembly as set forth in claim 9 wherein said lifting system is a drilling block.

12. A retaining pin assembly as set forth in claim 9 wherein said lifting system is a single or multiple hook assembly.

13. A retaining pin assembly as set forth in claim 1 wherein said hook cam retaining pin head is threadably connected to said shaft.

14. A retaining pin assembly for a lifting system wherein said lifting system includes a hook prong and a hook cam, said retaining pin assembly comprising:
- at least one bail area having a first and with at least one aperture which aligns with an opening through said hook cam and having an opposed second end with at least one aperture which aligns with an opening through said hook prong;
- a hook cam retaining pin having a had and having a shaft passing through said bail arm first end aperture, wherein said hook cam retaining pin shaft has at least one slot therein parallel to the axis of said shaft which groove extends to said head of said retaining pin and wherein said hook cam retaining pin has external threads which mate with threads in said hook cam aperture;
- a retaining clip surrounding said hook cam retaining pin shaft, said retaining clip having at least one inwardly extending tab received in said at least one shaft slot in order to retain said pin in said bail arm; and
- a recess in said bail arm to receive said retaining clip therein when said hook cam retaining pin is retracted;
- a hook prong retaining pin having a head and having a shaft passing through said bail arm second end aperture, wherein said hook prong retaining pin shaft has at least one slot therein parallel to the axis of said shaft;
- a retaining clip surrounding said hook prong retaining pin shaft, said retaining clip having at least one inwardly extending tab received in said at least one shaft slot adapted to retain said pin in said bail arm; and
- a recess in said bail arm adapted to receive said retaining clip therein when said hook prong retaining pin is axially retracted.

15. A retaining pin assembly for a lifting system as set forth claim 14 wherein said at least one bail arm comprises a pair of parallel bail arms joined by a cross arm, wherein said first ends of said hail arms surround said hook cam and wherein said second ends of said bail arms surround said hook prong.

16. A retaining pin assembly for a lifting system as set forth in claim 14 wherein a space between said pair of parallel bail arms is slightly larger than a width of said hook cam and said hook prong.

17. A retaining pin assembly for a lifting system as set forth in claim 14 wherein said at least one slot comprises three parallel slots in said hook cam retaining pin shaft and three parallel slots in said hook prong retaining pin shaft.

18. A retaining pin assembly for a lifting system as set forth in claim 14 wherein said hook cam retaining pin head is threadably connected to said shaft.

19. A retaining pin assembly for a lifting system wherein said lifting system includes a hook prong and a hook cam, said retaining pin assembly comprising:
- at least one lock arm having a first end with at least one aperture which aligns with an opening through said hook cam and having, an opposed second end with at least one aperture which aligns with an opening through said hook prong;
- a hook cam retaining pin having a head and having a shaft passing through said hook cam opening and said lock arm first end aperture, wherein said shaft has at least one slot therein parallel to the axis of said shaft and wherein said hook cam retaining pin head is threadably connected to said shaft which slot extends to said head of said retaining pin;
- a retaining ring surrounding said hook cam shaft, said retaining ring having at least one inwardly extending tab received in said at least one shaft slot adapted to retain said hook cam retaining pin in said lock arm; and
- a recess in said lock arm adapted to receive said hook cam retaining ring therein when said hook cam retaining pin is axially retraced.

20. A retaining pin assembly for a lifting system as set forth in claim 19 including a prong retaining pin having a head and having a shaft passing through said prong opening and said lock arm second aperture, wherein said prong retaining pin shaft has at least one slot therein parallel to the axis of said shaft wherein said prong retaining pin head is threadably connected to said shaft;
- a retaining ring surrounding said hook prong shaft, said retaining ring having at least one inwardly extending tab received in said at least one shaft groove in order to retain said pin in said lock arm; and
- a recess in said lock arm to receive said retaining ring therein when said prong retaining pin is axially retracted.

* * * * *